D. SMAIL.
SPRING HUB.
APPLICATION FILED MAY 9, 1911.

1,044,277.

Patented Nov. 12, 1912.
2 SHEETS—SHEET 1.

Inventor
David Smail,

Witnesses
Frank Hough

By Victor J. Evans
Attorney

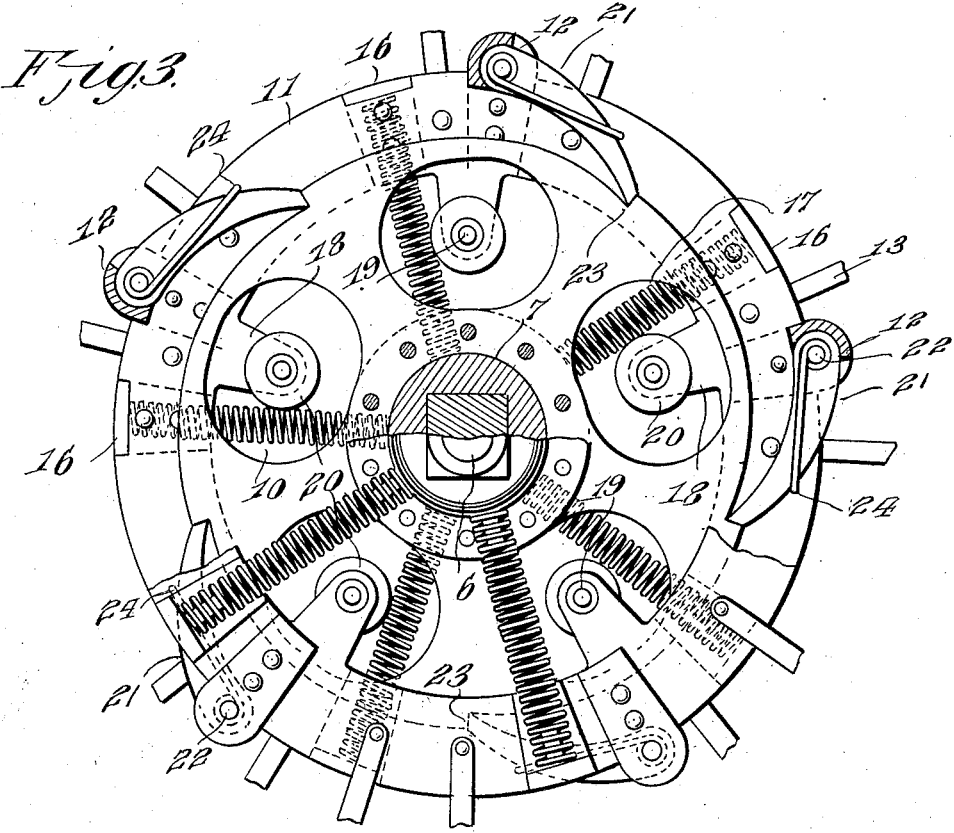

UNITED STATES PATENT OFFICE.

DAVID SMAIL, OF KANSAS CITY, MISSOURI.

SPRING-HUB.

1,044,277. Specification of Letters Patent. Patented Nov. 12, 1912.

Application filed May 9, 1911. Serial No. 625,969.

*To all whom it may concern:*

Be it known that I, DAVID SMAIL, a citizen of the United States, residing at Kansas City, in the county of Jackson and State of Missouri, have invented new and useful Improvements in Spring-Hubs, of which the following is a specification.

The invention relates to vehicle wheels, and more particularly to the class of spring wheels or resilient hubs therefor.

The primary object of the invention is the provision of a spring wheel in which the hub thereof is yieldably supported, thereby enabling all shocks and jars to be absorbed by the wheel, during the travel of the same.

Another object of the invention is the provision of a spring wheel in which the requisite resiliency is obtained, without destroying the strength of the wheel to sustain heavy loads, thus the wheel will absorb all shocks and jars incident to the travel of the same when passing over irregular surfaces in the ground.

A further object of the invention is the provision of a vehicle wheel, in which any longitudinal thrust of the vehicle will be absorbed, thus relieving the same from sudden strain, thereby increasing the life of the vehicle.

A still further object of the invention is the provision of a vehicle wheel, which is simple of construction, thoroughly reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claim hereunto appended.

Figure 1:
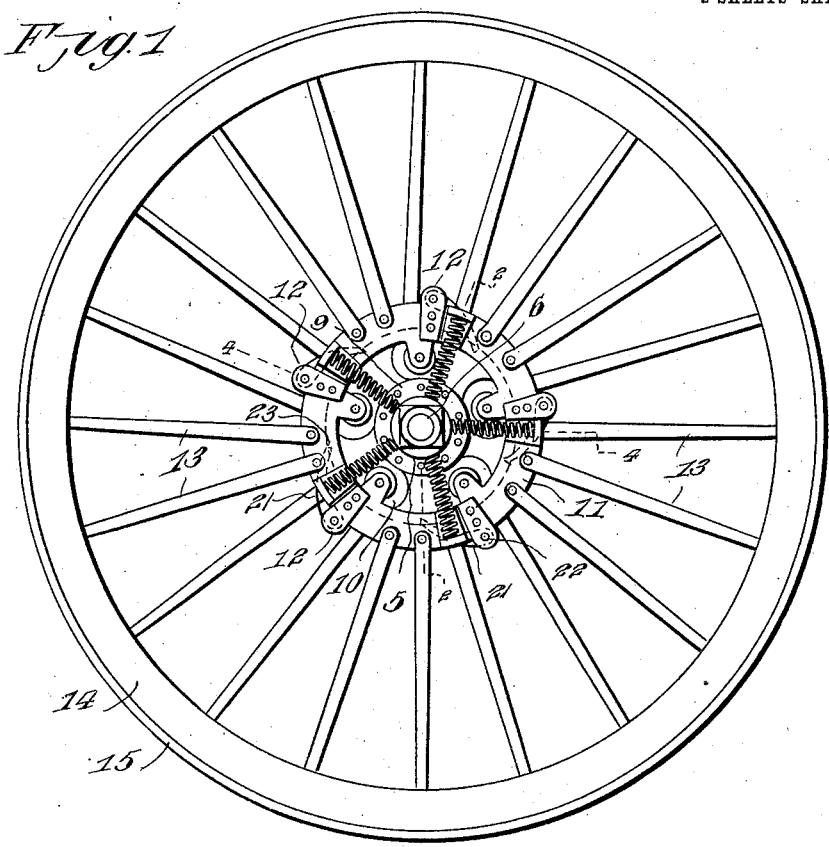
Figure 2:
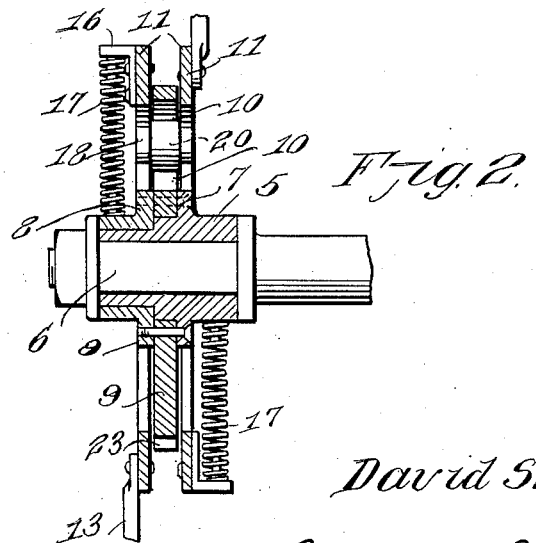

In the drawings: Figure 1 is a side elevation of a vehicle wheel constructed in accordance with the invention. Fig. 2 is a vertical sectional view on the line 2—2 of Fig. 1. Fig. 3 is a vertical transverse sectional elevation of the wheel. Fig. 4 is a section on the line 4—4 of Fig. 1.

Similar reference characters indicate corresponding parts throughout the several views of the drawings.

Referring to the drawings by numerals, the spring wheel comprises a center hub 5 which is of the ordinary well-known construction, adapted to receive the spindle 6 of a vehicle axle, the spindle 6 and likewise the bore in the hub 5 being correspondingly squared, although the same may be circular-shaped; thus in the latter instance, the hub 5 will revolve on the spindle, while in the first instance, said hub will rotate with the spindle. Formed medially in the exterior surface of the hub 5 is an annular groove 7, and in juxta-position relative thereto and at opposite sides thereof, are circular flanges 8, between which and engaging in the groove 7, is a circular-shaped member or disk 9, containing spaced circular-shaped openings 10 concentrically disposed with respect to the hub 5, the member or disk 9 being suitably bolted or otherwise fixed to the flanges 8, thus making it stationary and a unitary part of the hub.

Arranged concentrically with respect to the hub 5, and at opposite sides of the circular-shaped member or disk 9, are outer ring members 11, the same being joined at their outer peripheral edges at intervals by means of cross webs 12 which serve to hold the ring members 11 in alinement with each other. Suitably fixed to the outer faces of the ring members 11 are radially extending spokes 13, to the outer ends of which is fixed a felly or rim 14, the latter carrying a tire 15 of any ordinary well-known construction.

Formed on or suitably fixed at diametrically opposite points of the ring members 11, at their outer faces, are L-shaped bearings 16, between which and the hub 5 are disposed coiled compression springs 17, the same being of the required tensile strength, and each has one end suitably fixed to the adjacent bearing 16, while its opposite end is suitably fixed to the hub 5, the springs being designed to lie outside of the ring members 11 at opposite sides of the stationary disk or circular-shaped member 9, and are adapted to absorb or take up all shocks and strains incident to the vehicle wheel, when traveling over irregular surfaces in the ground. These springs 17 serve to normally maintain the hub 5 at the center of the vehicle wheel, and possess the requisite resiliency for cushioning shocks and jars or longitudinal thrust imposed upon the wheel when traveling.

Formed on the inner peripheral edges of the ring members 11 are alining spaced parallel ears 18, through which are passed bolt members 19, the latter intersecting the openings 10 in the circular-shaped member or disk 9, and between these ears 18 and loosely carried by the bolts 19 are friction rollers 20, which are adapted to contact with the walls of the openings 10 in the said member or disk 9 on displacement of the ring members 11 relative to the latter during the travel of a vehicle wheel.

Connected with the cross webs 12 uniting the ring members 11 are ratchet pawls 21, the same being connected to the said webs 12 by means of pivots 22, and are adapted to engage in notches 23 formed in the outer peripheral edge of the circular-shaped member or disk 9, the pawls 21 being held in engagement in the notches by means of yoke-like springs 24, the same being fixed to the outer peripheral edges of the ring members 11. These pawls 21, when engaging in the notches 23 in the circular-shaped member or disk 9, will lock the latter to the ring members 11, so as to cause the said ring members 11 to rotate with the disk 9 when the vehicle wheel is being driven or traveling in one direction. However, upon reverse rotation of the hub 5, the pawls 21 will disengage from the notches 23, so that the springs 11 will become tensioned, thereby pulling upon the ring members 11 to compensate for strain exerted upon the vehicle wheel.

From the foregoing, it is thought that the construction and operation of the invention will be thoroughly understood, without requiring a more extended explanation, and therefore the same has been omitted.

What is claimed is:

In a vehicle wheel, a hub having a stepped annular shoulder formed exteriorly thereof, a disk mounted upon the said shoulder and having spaced substantially circular shaped openings concentrically about the hub, flanges on said hub and at opposite sides of the disk, means passed through the flanges and disk for uniting the same, ratchet teeth formed on the outer periphery of the disk, ring members arranged concentric to said flanges and at opposite sides of the disk, spring held pawls pivotally supported by the ring members and working between the same for engagement with the ratchet teeth, rollers rotatably connected with the ring members and working in the said openings in the disk and adapted to limit the displacement of the hub relative to said ring members, compression springs acting upon the hub and said ring members to hold the said hub normally centered with relation to the ring members, and centering lugs carried by the hub and ring members respectively and engaged in the ends of the springs for holding the same.

In testimony whereof I affix my signature in presence of two witnesses.

DAVID SMAIL.

Witnesses:
JOSEPH W. JOHNSON,
FRED A. WENTWORTH.

---

Copies of this patent may be obtained for five cents each, by addressing the "Commissioner of Patents, Washington, D. C."